United States Patent [19]

Schöniger

[11] Patent Number: 5,678,334

[45] Date of Patent: Oct. 21, 1997

[54] LIGHTED DISPLAY BOARD

[76] Inventor: Karl-Heinz Schöniger, Barbarossastrasse 40/6, 73732 Esslingen, Germany

[21] Appl. No.: 503,411

[22] Filed: Jul. 17, 1995

[30] Foreign Application Priority Data

Jul. 16, 1994 [DE] Germany ............... 44 25 246.3

[51] Int. Cl.⁶ ............................................. G09F 13/18
[52] U.S. Cl. ............................................. 40/546; 40/446
[58] Field of Search ............................................. 40/446, 546

[56] References Cited

U.S. PATENT DOCUMENTS

| | | |
|---|---|---|
| 1,816,220 | 7/1931 | Hotchner . |
| 1,843,980 | 2/1932 | Hotchner . |
| 1,963,156 | 9/1934 | Stewart . |
| 2,223,409 | 12/1940 | Dixon . |
| 4,484,104 | 11/1984 | O'Brien . |
| 4,679,044 | 7/1987 | Knoll . |
| 5,093,765 | 3/1992 | Kashima et al. . |
| 5,349,503 | 9/1994 | Blonder et al. . |
| 5,390,436 | 2/1995 | Ashall .............. 40/546 |

FOREIGN PATENT DOCUMENTS

| | | |
|---|---|---|
| 0 355 805 | 2/1990 | European Pat. Off. . |
| 0 403 764 | 12/1990 | European Pat. Off. . |
| 0 561 329 | 11/1993 | European Pat. Off. . |
| 2576441 | 7/1986 | France . |
| 6601437 | 4/1969 | Germany . |
| 25 25 088 | 12/1976 | Germany . |
| 2722291 | 5/1977 | Germany . |
| 2902022 | 2/1979 | Germany . |
| 3337128 | 10/1983 | Germany . |
| 3343829 | 12/1983 | Germany . |
| 3611174 | 4/1986 | Germany . |
| 3825436 | 7/1988 | Germany . |
| 37 36 804 | 5/1989 | Germany . |
| 3931668 | 8/1989 | Germany . |
| 43 01 337 | 7/1994 | Germany . |
| 43 01 339 | 7/1994 | Germany . |
| 2113883 | 8/1983 | United Kingdom . |
| 2165631 | 4/1986 | United Kingdom . |
| 2234581 | 2/1991 | United Kingdom . |

*Primary Examiner*—Kenneth J. Dorner
*Assistant Examiner*—Cassandra Davis
*Attorney, Agent, or Firm*—Browdy and Neimark

[57] ABSTRACT

A display board, such as an advertising sign, information sign, road sign, or the like, comprises a panel 10 of transparent material which has at least one lighting element 13 for illuminating the panel from the edge on at least one lateral defining edge. At least one of the two flat sides of the panel is at least partially covered with an opacifier film. The panel which is provided with the opacifier film is provided to backlight display symbols to be mounted onto he front flat side seen by an observer. The light reaching the contact face between the panel and opacifier film, form the panel into the opacifier film, is scattered by the opacification of the film, so that the entire opacifier film lights up and provides an evenly bright face for backlighting a panel provided with display symbols.

27 Claims, 2 Drawing Sheets

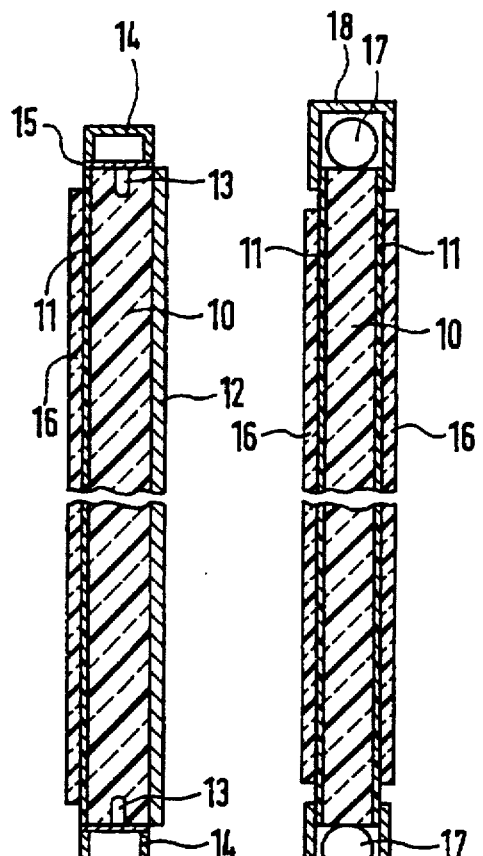
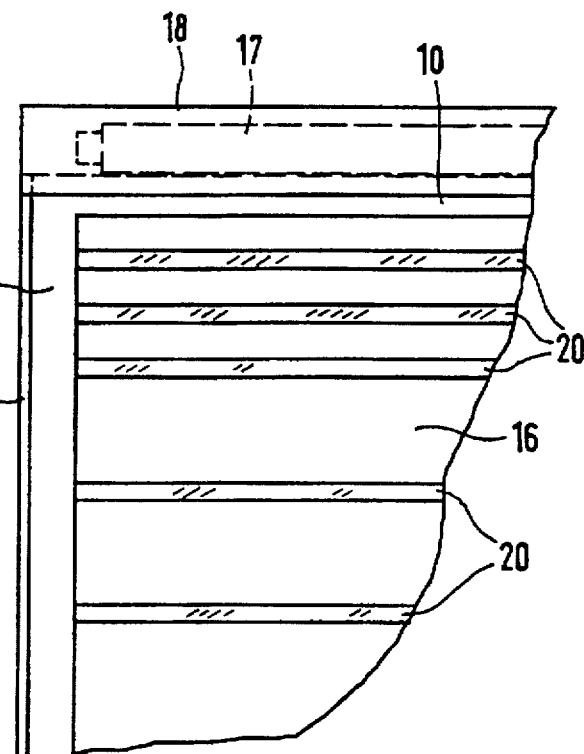
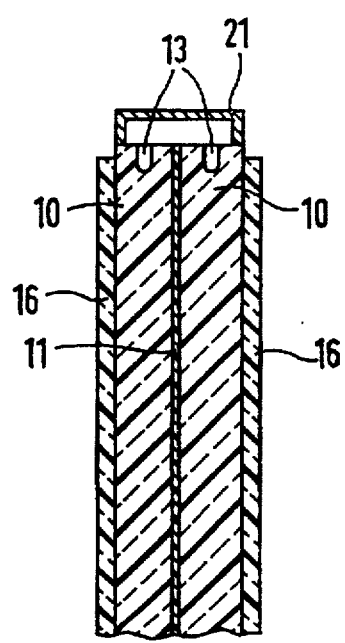
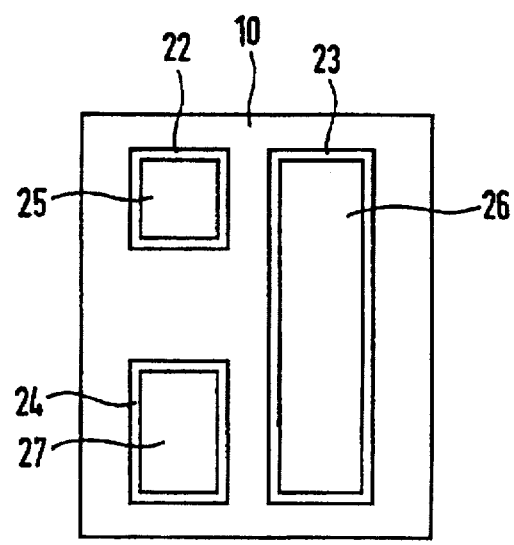
Fig. 1  Fig. 2  Fig. 3  Fig. 4  Fig. 5

LIGHTED DISPLAY BOARD

FIELD OF THE INVENTION

The present invention relates to a lighted display board, particularly for use as an advertising sign, an informative sign, a road sign, or the like. The lighted display board comprises a panel of transparent material which has on one lateral defining edge a lighting element which illuminates the panel from the edge. The panel is provided to illuminate display symbols.

BACKGROUND OF THE INVENTION

DE 38 25 436 C2 discloses a lighted display board wherein LEDs for illumination are introduced into the edge of the panel serving as a light board. On the back of the panel, facing away from the observer, display symbols to be illuminated are firmly attached to the panel. Since the light, which is otherwise totally reflected within the panel, emerges at the faces where the display symbols contact the pane, the display symbols are illuminated and are visible through the transparent panel.

The disadvantage of this known device is that the display symbol must be firmly attached to the panel, which makes it very difficult to change the symbols. This makes the device unsuitable for display symbols which must be changed fairly often, such as timetables, advertising symbols, advertising graphics, or the like. The disposition of the symbols behind the sign also makes it hard to change the symbols.

U.S. Pat. No. 4,484,104, also discloses a display face which is lit from behind, which makes it possible to provide backlit display symbols, display faces, or display boards that are to be illuminated. To do so, this known device requires a housing in which lighting elements such as neon lamps are disposed. The disadvantage of this known device is that the housing is relatively voluminous, and that it is very difficult to achieve an even distribution of light over the backlit panel.

SUMMARY OF THE INVENTION

It is an object of the present invention to overcome the aforesaid disadvantages of the prior art.

It is another object of the present invention of achieve a very flat, evenly lit display board for backlighting display symbols or panels.

The object of the present invention is attained by providing a display board wherein at least one of the two flat sides of the panel is at least partially covered with an opacifier film and the panel, which is provided with the opacifier film, is intended for backlighting display symbols which are to be mounted on the front flat side of the panel seen by an observer.

The opacifier film contributes only insignificantly to the thickness of the overall device, which is thus determined essentially by the relatively thin panel. Consequently, it is possible to produce a lighted display board in the form of a thin panel. At the contact face between the panel and the opacifier film, the light emerges from the panel and reaches into the opacifier film. As a result the entire opacifier film is illuminated by scattering light, which provides an evenly lit lighting surface, as variations in luminosity are balanced by means of light conduction in the opacifier film. Display symbols, display faces, display panels, or the like can now be disposed on this lighting surface, which are then backlit. The symbols, etc. can be hung directly in front of the panel provided with the opacifier film or at a distance from the panel. This makes for easy replacement, which is particularly advantageous, especially for backlit timetables, notices, advertising panels, or the like. The hindrance to even distribution of light caused by scratches or other unevenness on the panel is compensated for to a large extent by means of the opacifier film. The entire display board can be manufactured very cheaply, since a conventional plexiglas or glass plate can be used and opacifier films can be obtained cheaply as precut goods.

The present invention provides an illuminated display board which can be used, for example, as an advertising sign, an informative sign, or road sign, comprising a panel of transparent material which on at least one lateral defining edge has at least one lighting element which illuminates the panel from the edge, the panel being intended for illuminating display symbols. At least one of the two flat sides of the panel is covered at least partially with an opacifier film, and the panel provided with the opacifier film is used for backlighting display symbols which are mounted on the front flat side of the panel seen by an observer.

The opacifier film may be applied in any manner. However, in one embodiment, the opacifier film is a self-adhesive film, which makes mounting on the panel simpler and easier. The self-illuminating effect of the opacifier film is further strengthened by means of a surface structure on the opacifier film, which prevents it from sticking to the panel over the entire surface of the panel. The surface structure may be grainy or nubbed, and prevents the opacifier film from sticking to the panel all over. This makes it easier to remove the opacifier film, and makes for easier correction while in the process of adhering the film to the panel.

The best lighting effect and light yield is achieved by disposing the opacifier film on the flat side of the panel on which side the display symbols are mounted. In one embodiment of the present invention, the flat side of the panel, i.e., the side that is not provided with opacifier film, is proved with a reflective face element.

The panel is provided advantageously with opacifier films on both sides of the panel, and the panel provided with the opacifier films is positioned between two arrangements of display symbols. The panel provided with the opacifier films is positioned to light up two arrangements of display symbols between them. Alternatively, the opacifier film can also be disposed between two panels which are provided with arrangements of display symbols on the flat sides which are not in contact with the opacifier film. By this means, a display board can be produced which has display faces on both sides. In this case, the opacifier film is appropriately embodied as a double-sided, self-adhesive film.

The display symbols may be disposed on or in an substantially transparent display panel or display film, which can be mounted in front of the panel provided with the opacifier film.

To achieve the illumination of individual advertising or information signs, the opacifier film may be mounted only on those faces of the plate which substantially coincide with the faces provided with display symbols. In this fashion, the light can be economically concentrated on the essential places.

In order to prevent loss of light, the edge faces of the panel that are not intended to be illuminating faces for the at least one lighting element may be provided with a reflective layer, and, in particular, may be mirrored. That is, the faces that light would pass through and would thus be lighted up can be provided with a reflective layer, or mirror, so that the light does not pass through. In this connection, either neon tubes or LEDs can be inserted into the edges of the panel, which guarantees particularly energy-saving illumination because the light, which is mounted directly in the panel, can serve as lighting elements.

The lighting elements may be of any conventional light source. Among the preferred light sources that can be used in the present invention are neon tubes or LEDs.

The opacifier film may be perforated.

BRIEF DESCRIPTION OF THE DRAWINGS

FIG. 1 is a sectional representation of a first exemplary embodiment with an opacifier film stuck to one side of a panel.

FIG. 2 is a sectional representation of a second exemplary embodiment with a plate provided with opacifier films on both sides.

FIG. 3 is a front view of a corner region of the display board according to FIG. 2.

FIG. 4 shows a third embodiment, with opacifier film disposed between two panels.

FIG. 5 is a front view of a display board which is only partially provided with an opacifier film and display faces.

DETAILED DESCRIPTION OF THE INVENTION

Figure 6:
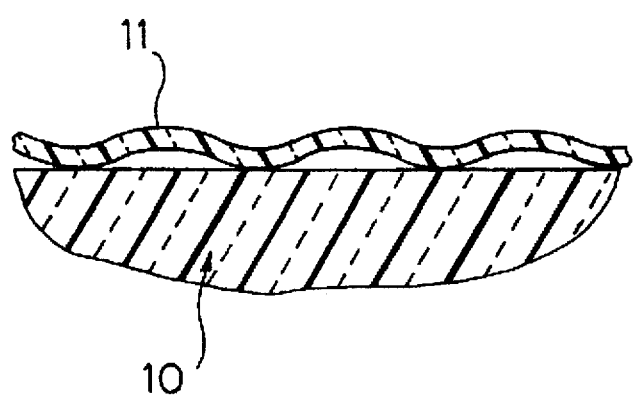
FIG. 6 is a schematic cross-sectional view of a nubbed or grainy opacifier film.

The display board shown in section in FIG. 1 essentially comprises a transparent light board, hereinafter called the panel, 10. This panel 10 may be made of plexiglas, some other transparent plastic material, or glass. A self-adhesive opacifier film 11, or clouding film, is adhered to one flat side of this panel 10. The opacifier film or clouding film is a plastic or flexible film, which has some means for opacifying or diffusing light. For example, the film can be milky, translucent, opaque, or the like. It is essential that light scattering be effected by means of the opacification. This opacifier film can also be grainy or nubbed, at least on the sticky side, so that it does not stick to the panel 10 over the entire surface of the panel and can be removed form the panel relatively easily. A reflection panel 12 is disposed on the flat side of the panel 10 opposite from the side with the opacifier film 11.

The term "film", unless otherwise noted, as used herein, refers to a sheetlike material which may be in the form of what is conventionally called foil or film. "Opacification" herein refers to scattering light to make the opacifying film appear milky or translucent or opaque. The film 11 changes an otherwise entirely transparent panel into a panel that ranges from slightly translucent to fully opaque.

On the circumferential edges of the panel 10, LEDs (light emitting diodes) 13 are introduced into the panel 10 by means of appropriate bores. These LEDs are supplied with an operating voltage via a frame 14 encompassing the panel 10. These LEDs 13 can be disposed on all four sides of the panel, spaced close together or far apart, or only on individual sides of the panel, depending on the quantity of light desired. These can be LEDs of all the same color, or LEDs of different colors, so as to produce various color effects. In order to generate white light, red, green, and blue LEDs can also be simultaneously switched on. Electronic control switches for the LEDs 13 can be accommodated in the frame 14 in a manner not shown. In order to prevent light loss, the edges of the panel 10 are provided with a reflective layer 15, or in other words, are, for example, mirrored.

On the flat side of the panel 10 provided with the opacifier film 11, a display panel 16 is disposed or fixed. A space can also be provided between the display panel 16 and the opacifier film 11. The display panel 16 can be securely mounted or hung. It is embodied as a substantially transparent panel on which or in which display symbols are disposed. By way of example, these display symbols are information such as timetables, announcements, notices, or the like, or advertising texts, advertising graphics, and the like. The entire display board can be a road sign or an informative sign, in which case the display panel 16 then shows the appropriate illustrations. The symbols to be placed there can be set off colorwise from the rest of the background, which can likewise be of one color or multi-colored. At the same time, it is possible to employ the display symbols as either totally or partially opaque. The reverse is likewise possible, i.e., transparent display symbols on an opaque background. In the display pane 16, it is essential that the device is suited for backlighting by means of a lighting surface.

The function of the display board shown is essentially that the light produced by the LEDs 13 shine into the panel 10 where it would be totally reflected if no opacifier film 11 were provided. However, the light emerges from the panel 10 and enters the opacifier film 11 where the panel contacts the opacifier film. As a result of the opacification, the opacifier film 11 lights by means of light scattering. Because there is some light conduction in the opacifier film 11, the evening out of possible variations in luminosity is assured. Consequently, the opacifier film 11 lights up as an even, luminous lighting surface. This is further supported by means of the reflection panel 12 on the back side of the panel 10. An even backlighting of the display panel 16 is produced by means of this evenly illuminating opacifier film 11. The display panel 16 can be easily replaced, for example, if the advertising sign or the information should be changed or updated.

The second exemplary embodiment shown in FIGS. 2 and 3 corresponds to a large extent to the first exemplary embodiment. The same elements, or elements that function in the same manner, are provided with the same reference numerals and are not described further.

Diverging from the first exemplary embodiment, here both flat sides of the panel 10 are provided with opacifier films 11 and display panels 16 are disposed in the outside of the display board thus embodied. Consequently, information or displays can be conveyed on both sides of the panel 10. The two display panels 16 can be embodied identically or differently.

For illumination, the upper and lower edges of the panel 10 here are provided with neon tubes 17, which shine their light into the panel 10 via the edges. A conduit-shaped housing 18 shields the neon tubes 17 on the outside. The two side edges of the panel 10 are provided with a reflecting layer 19. This can also extend on the upper and lower edge in the region of the mounts of the neon tubes 17, which are not required for shining light in. Naturally, the shining in of light can also take place either on all four edges or, for example, on only one side, since the even distribution of light is guaranteed by the panel 10 and the opacifier film 11. The display panel 16 is provided here with a schematically represented graphic 20.

In the third exemplary embodiment, shown in FIG. 4, the same elements or elements which function in the same manner are provided with the same reference numerals and are not described further. Here an opacifier film 11 is disposed between two panels 10, which is embodied here as a doublesided, self-adhesive film. A display panel 16 is disposed on the two outsides of both panels 10. With this device too, as in the second exemplary embodiment, the panel 10 can carry information and/or display symbols on both flat sides. Here, as in the first exemplary embodiment, both panes 10 are provided with LEDs 13 for illumination. A frame 21 encompasses both panels 10. The reflective layer on the edges, not shown in particular here, can also extend onto the outer flat sides of the panels 10 far enough so that the LEDs 13 are shielded and cannot shine directly out.

FIG. 5 shows a front view of the flat side of a panel 10. In this embodiment, the entire flat side of the panel 10 is not covered with the opacifier film 11, but merely three regions, 22–24. Three display panels 25–27 are disposed in these regions 22–24. Since backlighting is required only in the region of the display panels 25–27, it is sufficient to cover the regions 22–24 with the opacifier film. No light emerges from the remaining regions, that is, the panel 10 remains essentially dark there. Focusing the light in regions 22–24 makes it relatively intense there, or else the lighting power can be reduced correspondingly.

Naturally, in lieu of display panels 16 or 25–27, display films or other flat structures which are suited to back lighting can also be employed.

The opacifier film 11 can also be very finely perforated film. The perforation holes should be so small that they are substantially invisible to the naked eye. Above all, if the opacifier film is structured or nubbed, air inclusions between the panel 10 and the opacifier film 11 can expand when the sun shines or when there is other heating, with the possibility that the opacifier film will come loose. Such loosening can be prevented by means of a perforation. For example the perforation can be made after assembly of the panel, using a needle roller of the kind used for massage purposes.

The foregoing description of the specific embodiments will so fully reveal the general nature of the invention that others can, by applying current knowledge, readily modify and/or adapt for various application such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

All references cited in this specification are hereby incorporated by reference.

What is claimed:

1. An illuminated display board comprising a panel of transparent material, said panel having at least one lateral defining edge on which is provided at least one lighting element which illuminates the panel from said edge;
   wherein at least one of the flat sides of the panel is covered at least partially with an opacifier film;
   display symbols are mounted on a front flat side of the panel to be seen by an observer; and
   the opacifier film has a surface structure which prevents it from adhering to the panel over an entire surface of the panel.

2. The display board according to claim 1 wherein the opacifier film is a self-adhesive film.

3. The display board according to claim 1, wherein the opacifier film has a grainy surface structure.

4. The display board according to claim 1 wherein the panel is provided with opacifier film on both sides of the panel and the panel is positioned between two arrangements of display symbols.

5. The display board according to claim 1 wherein the display symbols are disposed on a display film which is mounted in front of the panel provided with the opacifier film.

6. The display board according to claim 1 wherein the opacifier film is mounted only on those faces of a plate which substantially coincide with the faces provided with display symbols.

7. The display board according to claim 1 wherein the edge faces of the panel that are not intended to be illuminating faces of the at least one lighting element are provided with a reflective layer.

8. The display board according to claim 7 wherein the reflective layer is a mirrored layer.

9. The display board according to claim 1 wherein the lighting elements are neon tubes.

10. The display board according to claim 1, wherein the opacifier film has a nubbed surface structure.

11. The display board according to claim 1 wherein the display symbols are disposed in a display film which is mounted in front of the panel provided with the opacifier film.

12. The display board according to claim 1 wherein the display symbols are disposed on a substantially transparent display panel which is mounted in front of the panel provided with the opacifier film.

13. The display board according to claim 1 wherein the display symbols are disposed in a substantially transparent display panel which is mounted in front of the panel provided with the opacifier film.

14. The display board according to claim 1 wherein the lighting elements are LEDs.

15. An illuminated display board comprising a panel of transparent material said panel having at least one lateral defining edge on which is provided at least one lighting element which illuminates the panel from said edge;
   wherein at least one of the flat sides of the panel is covered at least partially with an opacifier film;
   display symbols are mounted on a front flat side of the panel to be seen by an observer;
   wherein the opacifier film is perforated.

16. The display board according to claim 15 wherein the opacifier film is a self-adhesive film.

17. The display board according to claim 15, wherein the opacifier film has a grainy surface structure.

18. The display board according to claim 15 wherein the display symbols are disposed on a display film which is mounted in front of the panel provided with the opacifier film.

19. The display board according to claim 15 wherein the opacifier film is mounted only on those faces of the plate which substantially coincide with the faces provided with display symbols.

20. The display board according to claim 15 wherein the edge faces of the panel that are not intended to be illuminating faces of the at least one lighting element are provided with a reflective layer.

21. The display board according to claim 25 wherein the reflective layer is a mirrored layer.

22. The display board according to claim 15 wherein the lighting elements are neon tubes.

23. The display board according to claim 15, wherein the opacifier film has a nubbed surface structure.

24. The display board according to claim 15 wherein the display symbols are disposed in a display film which is mounted in front of the panel provided with the opacifier film.

25. The display board according to claim 15 wherein the display symbols are disposed on a substantially transparent display panel which is mounted in front of the panel provided with the opacifier film.

26. The display board according to claim 15 wherein the display symbols are disposed in a substantially transparent display panel which is mounted in front of the panel provided with the opacifier film.

27. The display board according to claim 15 wherein the lighting elements are LEDs.

* * * * *